United States Patent [19]

Herzfeld

[11] Patent Number: 4,639,157
[45] Date of Patent: Jan. 27, 1987

[54] SECTIONALIZED FOLDER

[76] Inventor: Jason H. Herzfeld, 713 Double Tree La., Long Beach, Calif. 90815

[21] Appl. No.: 768,197

[22] Filed: Aug. 22, 1985

[51] Int. Cl.⁴ ............... B42F 11/00; B42F 7/06; B42D 3/06
[52] U.S. Cl. .................... 402/19; 402/12; 281/31
[58] Field of Search ........ 402/76, 77, 78, 79, 402/12, 19; 282/11.5 R; 229/72, 84, 93; 40/405, 104.49; 281/31, 38

[56] References Cited

U.S. PATENT DOCUMENTS

| | | | |
|---|---|---|---|
| 267,975 | 11/1882 | Dewey | 402/12 |
| 1,672,880 | 6/1928 | Cohen | 283/66 R |
| 2,280,889 | 4/1940 | Buxton . | |
| 2,568,941 | 9/1951 | Benson . | |
| 3,021,156 | 2/1962 | Coillot | 281/31 |
| 3,111,126 | 11/1963 | Broxten | 402/19 |
| 3,516,599 | 8/1968 | Buttery . | |
| 3,668,979 | 10/1969 | Cariven . | |
| 4,004,690 | 1/1977 | Giarritta | 150/147 |
| 4,345,394 | 8/1982 | Sullivan | 40/405 |
| 4,419,837 | 12/1983 | Meeker . | |
| 4,447,973 | 5/1984 | Wihlke . | |
| 4,485,962 | 12/1984 | Farley . | |
| 4,492,390 | 1/1985 | Jacobs et al. | 150/147 |

Primary Examiner—Paul A. Bell
Assistant Examiner—Paul M. Heyrana, Sr.
Attorney, Agent, or Firm—Howard A. Kenyon

[57] ABSTRACT

A file folder has a front and a back cover which are joined together so as to allow the folder to open and close. Each cover has a pocket mounted at its outer lateral end position. Inner sheets are secured at one lateral edge of each to the inner line thereof to form tiered pockets which are opened at their upper, lower and outer lateral ends. The covers are provided with apertures at their inner lateral end portions so that the folder may be mounted in a conventional two or three ring loose leaf binder.

12 Claims, 4 Drawing Figures

SECTIONALIZED FOLDER

BACKGROUND OF THE INVENTION

1. Field of the Invention

The present invention is a new and improved file folder for retaining and segregating documents, papers and articles such as, for example, floppy discs in a readily accessible manner.

2. Description of the Prior Art

Typically, many prior art folders are designed to hold papers in vertical pockets. Such vertical pockets usually cover only a bottom portion of the papers contained therein. Thus, the papers retained therein may slide out when the folder is carried manually. In addition, such pockets are not typically capable of retaining more than a minimal number of sheets of paper therein. Thus, such prior art folders not only have a limited capacity but also have the disadvantage of providing inadequate retention of papers.

Other types of prior art folders are basically two or three ring loose leaf binders which may be sized to hold any number number of papers. The disadvantage with this type of folder is that the holes in the sheets which are retained therein tend to enlarge and tear over a period of use. This tends to loosen the fit of the sheets in the folder making the system look unsightly and may also make identification tags at the edges of the sheets difficult to see because the lateral edges of the sheets may extend out far enough as to completely cover these tags. In addition, after a period of use, the holes may ultimately enlarge to such an extent that the sheets are no longer retained properly and may easily fall out of the folder.

In order to increase the capacity of ring binders, some prior art folders have slits in thick retaining sheets in order to hold relatively small cards or the like therein. An example of such a prior art device in U.S. Pat. No. 4,419,837 to Meeker. The primary disadvantage with such a device is that it is very bulky and is very limited as to the type and size of the articles it is able to retain therein.

Other prior art folders which have pockets are constructed to have multiple fold lines in order to make the pockets separate from the covers when the folder is opened. However, such folders are also somewhat bulky and may be too complex to manufacture inexpensively. An example of such a prior art folder is U.S. Pat. No. 3,516,599 to Buttery.

Some other prior art folders have tiered pockets in order to organize the articles contained therein. An example of such a device is U.S. Pat. No. 2,280,889 to Buxton. The Buxton portfolio also has division strips for separating the individual pockets for each other and closure members for properly positioning and maintaining the positioning of the pockets. This device has many component parts interfitting in different ways and is thus inordinately complex; it may thus be difficult for the user to assemble and also expensive to manufacture.

Other prior art folders use pockets on the jackets to retain desired articles. Typically, the fold lines separating the pockets coincide with the fold line separating the covers. This makes the folder tend to resist closing if the covers and the pockets are thick. Moreover, because the fold lines coincide, there is excessive strain on the fold line ultimately resulting in cracking of the folder at or near the line. If, in order to overcome this disadvantage, the folder is designed to have large pockets, thereby making the folder capable of carrying a large number of articles therein, the pockets are usually required to be spaced from the covers. This spacing of the pockets makes the folder bulky and difficult to completely close.

Other prior art folders are combinations of the basic designs incorporated in the devices described above. An example of such a device is U.S. Pat. No. 2,568,941 to Benson. The Benson folder has both slots and pockets. However, due to the particular arrangement of the combination, the portfolio is particularly adapted for only one purpose. Thus, this type of prior art device is limited in its applications and is thus not very versatile.

Many other prior art folders are essentially more complex arrangements of pockets and flaps such as U.S. Pat. No. 3,668,979 to Carlven. Typically, such prior art devices tend to be complicated to manufacture and to use and may also be too heavy and bulky for their intended use.

Accordingly, a folder is needed that is relatively simple to manufacture and use and overcomes the shortcomings of the above mentioned prior art devices.

SUMMARY OF THE INVENTION

The principal object of the present invention is to provide a folder which can retain articles securely therein while being carried manually by the user.

Another object of the present invention is to provide a folder which is capable of segregating a large number of articles into an equally large number of categories.

Another object of the present invention is to provide a folder which may be retained in a conventional two or three ring binder.

An object of the present invention is to provide a folder which can retain computer floppy discs therein and provide some protection thereto by means of sheet flaps positioned between the discs.

Another object of the present invention is to provide a folder which is relatively thin when in a closed position.

Essentially, the present invention is a folder having a front and back cover which enables the folder to open and close. Each cover has a pocket at an outer lateral end portion thereof. The pockets face inwardly toward the connection of the covers. Inner sheets secured to the inner surface of each cover are folded so as to open outwardly toward the outer lateral ends of the covers. When documents are inserted in the folds of the inner sheets and the folder is manually carried, the sheets are pressed against the documents. Since the sheets cover relatively large portions of the documents, the documents are thereby more securely retained in the folder.

The folder of the present invention is easy to use and is not inordinately complex to manufacture. Any number of sheets may be positioned between the covers and folded over themselves so as to form tiered flaps allowing the easy separation of documents therein into multiple subjects. Thus, the folder makes the organization and segregation of various papers therein simple and easy.

DETAILED DESCRIPTION OF THE PREFERRED EMBODIMENT

Figure 1:
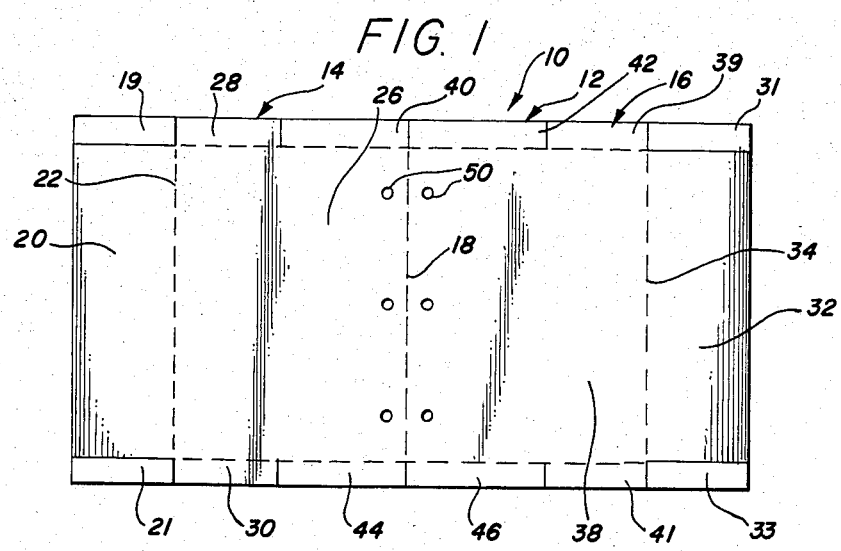
FIG. 1 is a plan view of the covers of the folder showing apertures for adaption to retention by a three ring binder.

Referring to the drawings, the folder of the present invention is generally designated by the numeral 10. The folder 10 has an outer sheet 12 comprising a front cover 14 and a back cover 16. Covers 14 and 16 are preferably of unitary construction and folded at a crease or medial line 18 thereof in order to form the front and back covers 14 and 16. However, the front cover 14 and back cover 16 also may each be separate components which are hingedly joined at an outer lateral edge thereof. The hinge (not shown) may be a spiral member (not shown) or other suitable interconnecting device passing through holes (not shown) in lateral edge portions of the front and back covers 14 and 16. The spiral member may, for example, be made of plastic or metal.

Front cover 14 has a front flap portion 20 at its outer lateral portion which is folded inwardly about a crease 22 to form a pocket 24 (shown in FIG. 3) at the outer lateral portion thereof. The front flap 20 is preferably glued at its longitudinal end portions 19 and 21 to the outer longitudinal end portions 28 and 30 of front cover 14 at its inner face 26. Alternatively, the longitudinal end portions 19 and 21 may be removed and front flap 20 may be glued to an outer upper front flap 28 and a outer lower front flap 30 of front cover 14 when flaps 28 and 30 are folded inwardly over flap 20. Similarly, back cover 16 has a back flap portion 32 at its outer internal portion. The flap 32 is folded inwardly about a crease 34 to form a pocket 36 (shown in FIG. 3) at the outer lateral portion thereof. The flap 32 is preferably glued at its longitudinal end portions 31 and 33 to the outer longitudinal end portions 39 and 41 of front cover 14 at is inner face 38. Alternatively, the longitudinal end portions 31 and 33 may be removed and back flap 32 may be glued to outer upper back flap 39 and outer lower back flap 41 which are folded inwardly over portions of flap 32. Both flaps 20 and 32 may alternatively be stitched to the inner faces 26 and 38.

As another alternative, the upper and lower flap portions 28, 30, 39 and 41 may be cut to the desired size and either glued or stitched to flap portions 20 and 32 at end portions thereof resulting in the desired pockets 24 and 36. This type of connection reinforces the end portions of front cover 14 and back cover 16, if desired. Inner upper flaps 40 and 42 and inner lower flaps 44 and 46 of covers 14 and 16 may also be folded inwardly or cut and glued to their respective inner faces 26 and 38 in order to reinforce and round off the upper and lower edges of covers 14 and 16.

Both covers 14 and 16 are preferably constructed of a heavy durable paper such as Kraft paper or any suitable material of a thickness appropriate for the folder's intended use.

Front cover 14 and back cover 16 are provided with three apertures 50 proximal the crease 18. Two apertures 50 may be provided instead of three. Apertures 50 allow the front cover 14 and back cover 16 to be inserted into and retained by a conventional two or three ring binder (not shown).

Figure 2:
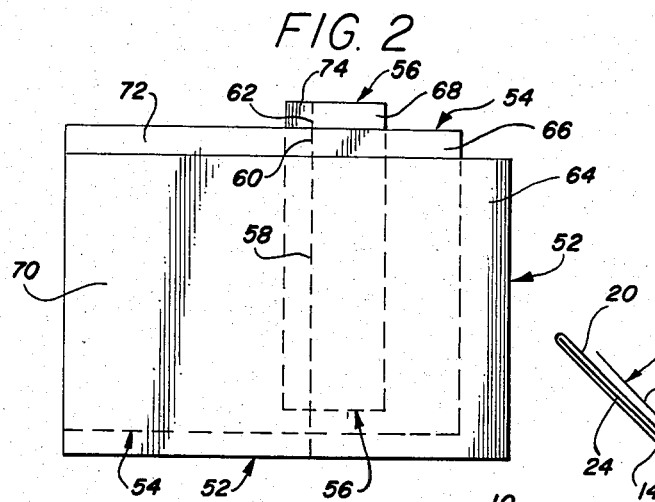
FIG. 2 is a plan view of the inner sheets forming the tiered flaps on the inner faces of the covers.

FIG. 2 shows the inner sheets 52, 54 and 56 of the folder 10 and their relative positioning. Sheets 52, 54 and 56 cover the inner face 26. Sheets 52, 54 and 56 are folded outwardly (toward pocket 24) along longitudinal lines 58, 60 and 62 on the sheets, respectively. Longitudinal line 60 is superimposed on line 58, and line 62 is superimposed on line 60. Because of this superimposing of the longitudinal lines and the different lengths of the sheets 52, 54 and 56, when folded outwardly, the sheets form tiered front inner sheet flaps or outer panels 64, 66 and 68. Inner panels 70, 72 and 74 of inner sheets 52, 54 and 56 are secured to the inner face 26. The securement of panels 70 and 72 is preferably at the inner surface of front flap 20. However, the securement of panel 74 is preferably at a portion of the inner face 26 proximal to the crease 18. Longitudinal lines 58, 60 and 62 are sufficiently distal of the crease 18 and aperatures 50 that the inner sheets do not interfere with the rings of a ring binder retaining the folder 10. Flap 64 preferably almost completely covers the inner face 26 so as to provide maximum coverage of an article which may be retained therein. In addition, flaps 64, 66 and 68 may be labeled at appropriate edges thereof in order to facilitate suitable segregation and organization of the articles which may be retained therein.

Figure 3:
FIG. 3 is an end view of the folder.
Figure 4:
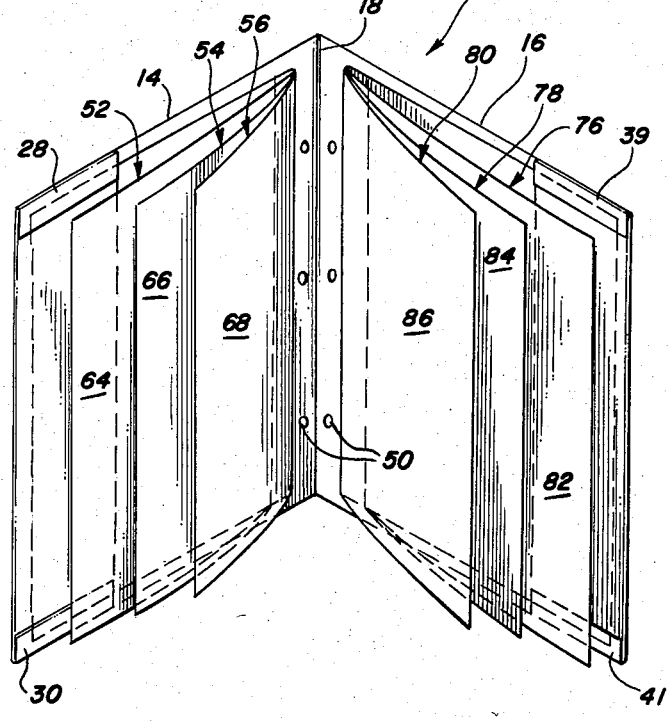
FIG. 4 is a perspective view of the folder.

Back cover 16 also has back inner sheets 76, 78 and 80 having longitudinal lines (not shown) which are superimposed on each other as with longitudinal lines 58, 60 and 62. The back inner sheets 76, 78 and 80 are similarly folded outwardly to form tiered flaps 82, 84 and 86. Since the back inner sheets are constructed and positioned similarly to front inner sheets 52, 54 and 56, they will not be described in more detail herein in order to avoid prolixity. FIG. 3 presents an end view of the folder showing how the inner sheets are layered. FIG. 4 presents a perspective view of the folder.

Although the present invention has been described with a certain degree of particularly, the description of the preferred embodiment has been made only by way of example, and many variations may be made within the scope and spirit of the invention as hereinafter claimed.

I claim:
1. A folder comprising:
   a front cover sheet;
   a back cover sheet hingedly connected to said front cover sheet at inner lateral edge portions thereof;
   a front flap covering an outer lateral portion of an inner face of said front cover, said front flap secured at its outer lateral edge to the outer lateral edge of said front cover and secured with a suitable adhesive at its upper and lower edges to upper and lower edges respectiely of said front cover to form a pocket at an outer lateral portion of said inner face;
   a back flap covering an outer lateral portion of an inner face of said back cover, said back flap secured at its outer lateral edge to the outer lateral edge of said front cover and secured with a suitable adhesive at its upper and lower edges to upper and lower edges respectively of said back cover to form a pocket at an outer lateral portion of said inner face of said back cover;
   a plurality of inner front sheets superimposed over said inner face of said front cover, said plurality of inner front sheets folded outwardly over themselves along a longitudinal line of each of said plurality of said inner front sheets, said longitudinal line of each of said plurality of sheets being superimposed over the longitudinal line of each successively lower sheet of said plurality of sheets;
   a plurality of inner back sheets superimposed over said inner face of said back cover, said plurality of inner back sheets folded outwardly over themselves along a longitudinal line of each of said plurality of said inner back sheets, said longitudinal line of each of said plurality of sheets being superimposed over the longitudinal line of each successively lower sheet of said plurality of sheets.

2. The folder of claim 1 wherein said front cover and said back cover have aperatures proximal to their lateral edge portions in order to allow the folder to be retained in a standard size three ring binder.

3. The folder of claim 1 wherein said front cover and said back cover have aperatures proximal to their lateral edge portions in order to allow the folder to be retaind in a standard size two ring binder.

4. The folder of claim 1 wherein said front cover and said back cover are composed of a stiff material.

5. The folder of claim 1 wherein said plurality of inner front sheets are glued at the lateral edge to said inner face of said front cover.

6. The folder of claim 1 wherein said plurality of inner back sheets are glued at the lateral edge to said inner face of said back cover.

7. The folder of claim 1 wherein said plurality of inner front sheets are stitched at the lateral edge to said inner face of said front cover.

8. The folder of claim 1 wherein said plurality of inner back sheets are stitched at the lateral edge to said inner face of said back cover.

9. A folder comprising:
an outer sheet foldable along a crease at a medial portion thereof to form a front cover and a back cover, said front cover having a front flap folded inwardly, said front flap having its upper edge connected to an upper edge of said front cover forming an upper flap, said upper flap folded inwardly over the upper edge of said front flap and connected thereto, said front flap having its lower edge connected to a lower edge of said front cover forming a lower flap, said lower flap folded inwardly over the lower edge of said front flap and connected thereto, said back cover having a back flap folded inwardly, said back flap having its upper edge connected to an outer upper edge of said back cover forming an upper flap, said upper flap folded inwardly over the upper edge of said back flap and connected thereto, said back flap having its lower edge connected to an lower edge of said back cover forming a lower flap, said lower flap folded inwardly over the lower edge of said back flap and connected thereto;
a first front inner sheet secured at one lateral edge portion to an inner surface of said front flap, said first front inner sheet folded outwardly along a longitudinal line on said first front inner sheet, the longitudinal line proximal to said crease, said first front inner sheet folded outwardly to form a first front inner sheet flap covering a portion of said inner face of said front cover;
a second front inner sheet secured at one lateral edge portion to an inner surface of said front flap, said second front inner sheet folded outwardly along a longitudinal line of said second front inner sheet, the longitudinal line of said first sheet being superimposed over the longitudinal line of said second front inner sheet, said second front inner sheet folded outwardly to form a second front inner sheet flap covering a portion of said first front inner sheet flap;
a third front inner sheet secured at one lateral edge portion to a portion of said front inner face proximal said crease, said third front inner sheet folded outwardly along a longitudinal line of said third front inner sheet, the longitudinal line of said second front inner sheet being suprimposed over the longitudinal line of said third front inner sheet, said third front inner sheet folded outwardly to form a third front inner sheet flap covering a portion of said second front inner sheet flap;
a first back inner sheet secured at one lateral edge portion to an inner surface of said back flap, said first back inner sheet folded outwardly along a longitudinal line of said first back inner sheet, the longitudinal line proximal to said crease, said first back inner sheet folded outwardly to form a first back inner sheet flap covering a portion of said inner face of said back cover;
a second back inner sheet secured at one lateral edge portion to an inner surface of said back flap, said second back inner sheet folded outwardly along a longitudinal line of said second back inner sheet, the longitudinal line of said first back sheet being superimposed over the longitudinal line of said second back inner sheet, said second back inner sheet folded outwardly to form a second back inner sheet flap covering a portion of said first back inner sheet flap;
a third back inner sheet secured at one lateral edge portion to a portion of said back inner face proximal said crease, said third back inner sheet folded outwardly along a longitudinal line on said third back inner sheet, the longitudinal line of said second back inner sheet being superimposed over the longitudinal line of the longitudinal line of said third back inner sheet, said third back inner sheet folded outwardly to form a third back inner sheet flap covering a portion of said second back inner sheet flap so that said first, second and third back flaps form tiered flaps.

10. The folder of claim 9 wherein said front cover and said back cover have aperatures proximal said crease in order to allow the folder to be retained in a standard size two ring binder.

11. The folder of claim 9 wherein said front cover and said back cover have aperatures proximal said crease in order to allow the folder to be retained in a standard size three ring binder.

12. The folder of claim 9 wherein said upper flaps and said lower flaps for said front flap and said back flap are connected by gluing.

* * * * *